May 15, 1923.
G. FERGUSON
RUBBER SOLE
Filed Aug. 13, 1919
1,454,885
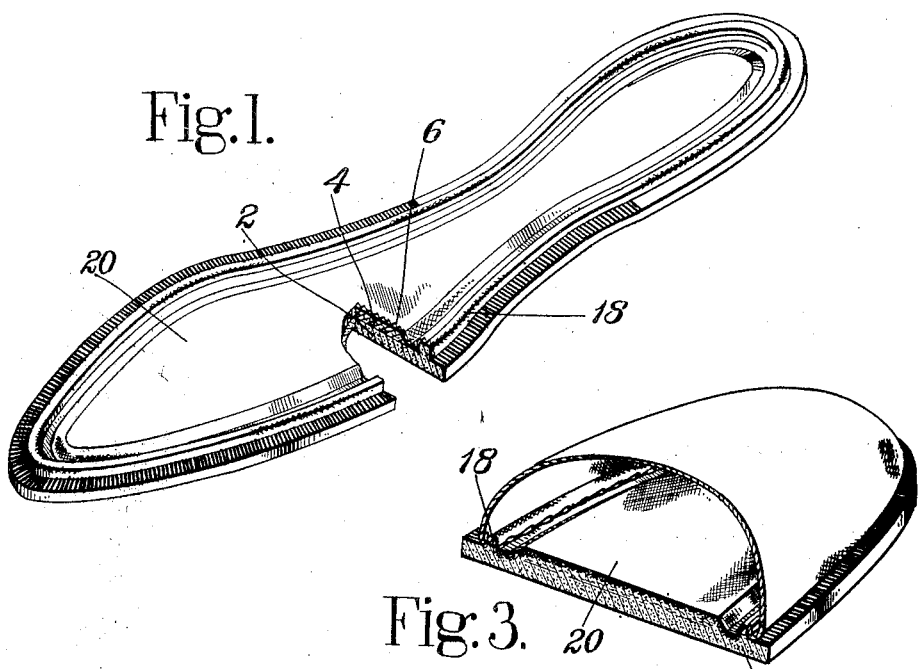
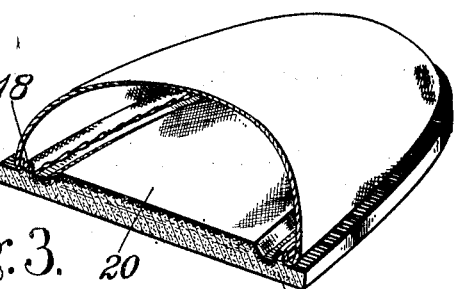
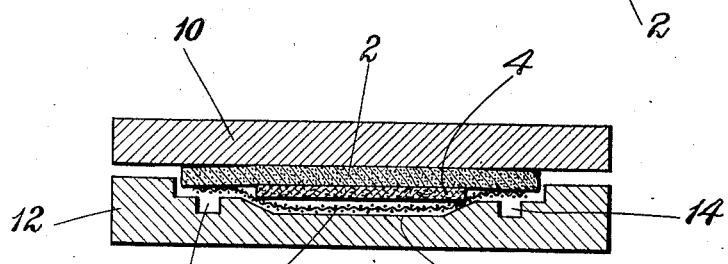
INVENTOR.
George Ferguson Patented May 15, 1923.

1,454,885

UNITED STATES PATENT OFFICE.

GEORGE FERGUSON, OF WOLLASTON, MASSACHUSETTS, ASSIGNOR TO UNITED SHOE MACHINERY CORPORATION, OF PATERSON, NEW JERSEY, A CORPORATION OF NEW JERSEY.

RUBBER SOLE.

Application filed August 13, 1919. Serial No. 317,203.

*To all whom it may concern:*

Be it known that I, GEORGE FERGUSON, a citizen of the United States, residing at Wollaston, in the county of Norfolk and State of Massachusetts, have invented certain Improvements in Rubber Soles, of which the following description, in connection with the accompanying drawings, is a specification, like reference characters on drawings indicating like parts in the several figures.

The present invention relates to improvements in soles for use in the manufacture of shoes and more especially it concerns a shoe sole made of molded and vulcanized rubber compound. By way of illustration the invention is herein shown and described as embodied in a rubber sole for use in the manufacture of turn shoes such as shown, for example, in my Patent No. 1,286,176, granted Nov. 26, 1918.

The invention has for an object to improve the structure of a rubber turn sole to the end that it may provide a more efficient and comfortable tread body for a turn shoe as well as a less expensive sole to manufacture than the rubber turn soles as heretofore made.

With the above and other objects in view, the invention contemplates the production of a rubber sole for turn shoes having an upper attaching rib extending along its upper marginal surface and comprising a tread layer of rubber suitable to constitute the tread surface of a turn sole, an intermediate layer of fibrous material having a relatively low rubber content and a top layer of textile material coextensive with the upper surface of the sole, the said three layers being bonded into a unitary sole structure by vulcanization.

A practical embodiment of the sole structure of the present invention will now be described in connection with the accompanying drawings and the invention with then be particularly pointed out in the appended claims.

In the drawings,—

Figure 1 is a perspective view partly in cross section illustrating a preferred embodiment of the sole of the present invention.

Fig. 2 is a sectional view illustrating one step in the production of the sole shown in Fig. 1, and Fig. 3 is a perspective view showing the incorporation of the sole in a turn shoe.

In producing the sole of the invention a layer 2 of rubber compound is first provided. The quality of the rubber compound may be, of course, varied but in order that it may provide the desired wear-resisting properties it should have a relatively high rubber content. An intermediate layer 4 of fibrous material is next placed upon the upper side of the body layer 2. This layer 4 should be of a relatively high fibrous content and a low rubber content. I have found that so-called "rag stock" which usually consists of a large proportion of shredded fabric and similar material with just sufficient rubber content to act as a binder for the shredded material can be used to advantage for this layer. As herein shown, the intermediate fibrous layer 4 is somewhat smaller than the main body layer 2 so that during subsequent vulcanization of the sole parts the outer edges of the intermediate layer 4 will be embedded in the material 2 of the tread layer. Moreover, in this way the material 4 will not extend into that portion of the sole which is molded up to form the sewing rib so that the sewing rib will comprise the better grade of rubber stock and the canvas material, thus making it much stronger to receive shoe upper attaching stitches. The top layer 6 for the sole consists of a piece of coarsely woven duck or canvas of a shape to cover the entire upper side of the sole but having its edge terminating within the edge of the body layer 2. After these three sole layers have been properly assembled one upon another, they are placed in a vulcanizing mold. As illustrated, this vulcanizing mold comprises two co-operating mold members 10 and 12 constructed to provide a sole-shaped cavity with a marginally extending groove 14 formed along the floor 16 of the cavity to produce a projecting sewing rib 18 along the upper marginal surface of the sole.

Also, the sole molding cavity is constructed to produce a sole having its upper surface 20 within the sewing rib 18 substantially flush with the top of the rib throughout the length of the sole. In the illustrated embodiment of the sole the sewing rib 18 extends around the heel seat portion of the sole to enable a sewed seat turn shoe to be produced. The sole is returned from the molds 10 and 12 after vulcanization, with the three sole parts 2, 4, 6 bonded together into a unitary sole structure, and the sewing rib 18 formed along the upper marginal surface of the sole, the portion of the sole within said rib being substantially flush with its top surface. It will be seen that the fibrous material 4, since it has a rubber content which becomes vulcanized, will not disintegrate during a continued flexing of the sole in service and also that it serves to effect a bonding of the top canvas layer to the sole so that said layer will not wrinkle or separate from the rubber body. Furthermore, it is necessary to use a relatively high grade of rubber compound for that portion of the sole only which is to receive the direct wear, while the less expensive fibrous layer is employed to "back up" and reinforce the tread layer and give the desired body to the sole. By reason of the fibrous character of this backing layer the sole is rendered practically unaffected by any unevenness of the walking surface and the interior of the shoe thus made more comfortable for the foot during the wear of the shoe. It is to be recognized that a turn shoe has only a single sole so that the foot engages the upper side of the sole and consequently it is essential to the comfort of the shoe for the sole to provide a substantial yet flexible tread body for the foot. Heretofore, however, in order to obtain these properties for the sole, it was necessary to use a relatively thick and heavy sole and a heavy sock lining to prevent any unevenness in the walking surface being transmitted to the foot. The top canvas layer 6, in addition to reinforcing the sole as a whole and particularly the sewing rib 18, serves to insure a complete incorporation of the fibrous layer 4 in the sole body even though this layer has a very low rubber content.

The sole of a structure such as that above described may be used in the manufacture of a turn shoe with the same facility and factory equipment as the rubber turn soles heretofore made or a leather sole and the resulting shoe provides stronger and more efficient tread surface than was heretofore possible.

The term "rubber" is herein used generically to include all of the various rubber compounds including the so-called "fibre" rubber compounds.

A sole having a filler portion the upper surface of which is located above the base of the sewing rib, and a mold for making such a sole are shown, described and claimed broadly in prior applications Serial Nos. 266,578 and 188,174 filed in my name.

Having described the invention, what I claim as new and desire to secure by Letters Patent of the United States is:

1. As an article of manufacture, a rubber sole for turn shoes provided with a marginally extending sewing rib on its upper side, and comprising a tread member of flexible rubber compound, an intermediate member of fibrous material having a relatively high fibrous content located within the rib, said member being comparatively stiff and of such thickness that its top is substantially at the level of the top of the rib, and a fabric member extending over the top of the intermediate member and the rib.

2. As an article of manufacture, a molded and vulcanized sole for turn shoes comprising a comparatively soft and flexible tread member of rubber having a sewing-rib formed thereon, an intermediate, comparatively stiff member of fibrous material having a low rubber content, said member being of such thickness that its upper surface is substantially flush with the top of the rib and serving by reason of its bulk and stiffness to prevent transmission through the flexible tread member to the foot of the wearer of localized pressure due to unevenness in the surface walked on, and a top member of fabric of an extent greater than that of the intermediate member extending over the intermediate member and the rib and terminating short of the edge of the tread member.

In testimony whereof I have signed my name to this specification.

GEORGE FERGUSON.